United States Patent [19]
Ishii et al.

[11] 3,958,743
[45] May 25, 1976

[54] WELDING PROCESS FOR ALUMINUM OR CHROME DIFFUSION-COATED STEEL

[75] Inventors: Kunio Ishii, Yokohama; Masao Izumiyama, Zushi; Keikichi Maeda, Yokohama, all of Japan

[73] Assignee: Japan Gasoline Co., Ltd., Tokyo, Japan

[22] Filed: July 7, 1975

[21] Appl. No.: 593,209

[30] Foreign Application Priority Data
July 22, 1974 Japan.............................. 49-83243

[52] U.S. Cl................................. 228/226; 228/263
[51] Int. Cl.²..................... B23K 5/10; B23K 35/30
[58] Field of Search ........... 228/175, 187, 226, 263; 219/76, 137 WM, 74

[56] References Cited
UNITED STATES PATENTS

| | | | |
|---|---|---|---|
| 2,054,939 | 9/1936 | Larson........................... | 228/187 X |
| 2,815,436 | 12/1957 | Bland................................... | 219/74 |
| 2,879,376 | 3/1959 | Petrovich..................... | 219/137 WM |
| 3,135,047 | 6/1964 | Houser............................. | 228/263 X |
| 3,476,909 | 11/1969 | Kameda et al.............. | 219/137 WM |

Primary Examiner—Al Lawrence Smith
Assistant Examiner—K. J. Ramsey
Attorney, Agent, or Firm—Woodhams, Blanchard and Flynn

[57] ABSTRACT

In conducting the butt welding of a coated steel produced by applying a diffusion coating with aluminum or chromium on the surface of a chromium-molybdenum steel as the base metal, adoption of a process comprising welding the diffusion-coating side of said coated steel with a ferritic high chrome steel to begin with, next welding it with a molybdenum steel or chromium-molybdenum steel selected on the bases of the content of chromium and the content of molybdenum in the base metal, and lastly welding it with the same material as the base metal, varieties of such drawbacks as would ordinarily arise from the weld zone can be avoided.

5 Claims, 2 Drawing Figures

WELDING PROCESS FOR ALUMINUM OR CHROME DIFFUSION-COATED STEEL

BACKGROUND OF THE INVENTION

The present invention relates to a multi-layer butt welding process for a coated steel produced by forming a diffusion coating with aluminum or chromium on a chromium-molybdenum steel by applying cementation thereto.

Heretofore, as the butt welding process for such a coated steel as above, a process comprising first welding the diffusion-coating side of the coated steel with a 13 Cr ferritic stainless steel and then completing the welding with the same material as the base metal of the coated steel has been popular. However, this conventional welding process is defective in that the corrosion resistance of the weld zone would lower according to the kind of the base metal; for instance, when the concentration of chromium in the base metal is relatively low, despite the welding is effected with a 13 Cr ferritic stainless steel, the concentration of chromium in the weld zone lowers to 10% or thereabouts, so that retention of a satisfactory corrosion resistance of the weld zone cannot be expected. As an alternate process, there has been proposed a multi-layer welding process (See Japanese Pat. No. 36814/1973). This process comprises: first welding the diffusion-coating side of a coated steel with an austenitic stainless steel, next welding it with a welding rod consisting of pure iron, and lastly welding it with the same material as the base metal. However, this process entails various problems such that because of the first layer of the weld zone being formed by employing an austenitic stainless steel, said weld zone is vulnerable to the stress corrosion cracking and/or thermal fatigue, and the employment of pure iron for the second layer thereof renders it substantially impossible to realize the homogeneity in composition of the part inside the weld zone, the weld zone and the base metal, resulting in the fear of bringing about a defect in respect of the strength of the weld zone as a whole.

SUMMARY OF THE INVENTION

The present inventors have fully examined the aforesaid problems accompanying the conventional welding processes, and have come to the finding that, in effecting the butt welding of a coated steel produced by employing a chromium-molybdenum steel as the base metal and applying a diffusion-coating with aluminum or chromium thereon, the following conditions are indispensable:

a. As to the first layer of weld zone, in order to check the lowering of the corrosion resistance of the weld zone and prevent the occurrence of any stress corrosion cracking and thermal fatigue in said layer, a welding rod consisting of ferritic stainless steel should be employed.

b. The second layer (or middle layer) at the time of completion of the welding should retain the concentration of chromium as well as molybdenum to be almost equal to that of the base metal.

Based on this finding, the present invention is intended to solve the foregoing various problems in the prior art which are ascribable to the welding with dissimilar materials, by applying a process as follows: in conducting the butt welding of a coated steel as above, the coated side is first welded with a ferritic stainless steel containing Cr to the extent of 15 to 26 wt.%, next welded with a low-alloy steel containing Cr to the extent of from 0 to 0.3x wt.% and Mo to the extent of from 0.4y to 1.4y wt.% [x and y herein represent Cr content (wt.%) and Mo content (wt.%), respectively, in the base metal], and further welded with the same material as the base metal, thereby to make the composition of the weld zone, and particularly the concentration of Cr as well as Mo therein, resemble that of the base metal.

DESCRIPTION OF THE PREFERRED EMBODIMENTS

Figure 1:
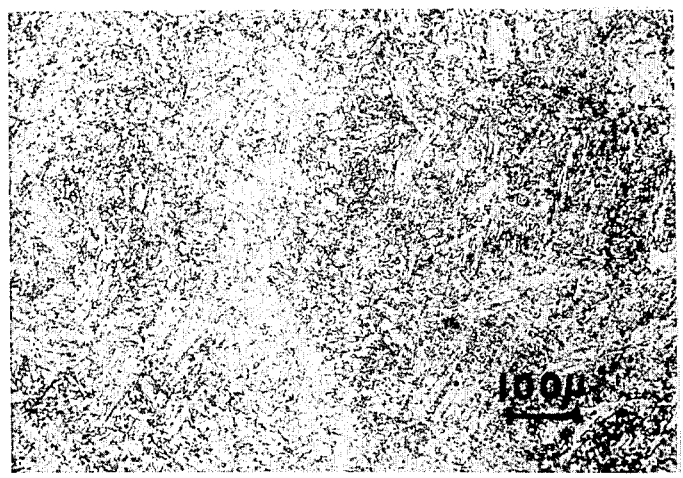
FIG. 1 is a microphotograph illustrative of the structure between the second layer and third layer of the weld zone resulting from the tri-layer butt welding effected on a coated steel having aluminum diffusion coating (base metal: 2¼ Cr — 1 Mo steel) through the process according to the present invention.

In the welding process according to the present invention, the coated steel to be subjected to welding is a coated steel produced by applying a diffusion coating with aluminum or chromium on the surface of the so-called chromium-molybdenum steel by a conventional method, and said chromium-molybdenum steel constituting the base metal comprises typically Cr to the extent of from 0.8 to 10 wt.% and Mo to the extent of from 0.4 to 1.5 wt.%.

According to the present invention, the coated side of said coated steel is first welded with a ferritic stainless steel containing Cr to the extent of from 15 to 26 wt.% (hereinafter called 'the 1st-layer welding rod' for short). The welding rod for use herein is of a high chrome steel which has hitherto been scarcely employed for this type of welding, but in the case of the present invention, the use of such high chrome steel is very important as it can provide a sufficient corrosion resistance for the first layer. Selection of the welding rod for this purpose depends on the concentration of Cr in the base metal; for instance, in the case of a base metal with high concentration of Cr, it is preferable to select a 1st-layer welding rod with a relatively low concentration of Cr, but as long as a 1st-layer welding rod consisting of a ferritic stainless steel containing Cr to the extent of from 15 to 26 wt.% is applied, a satisfactory first layer of the weld zone can be formed irrespective of the concentration of Cr in the base metal. By way of precaution, however, the desirable combination of the base metal and the 1st-layer welding rod is summarized as follows:

| base metal | 1st-layer welding rod |
|---|---|
| 1¼ Cr - ½ Mo steel ⎱ ⎰ 2¼ Cr - 1 Mo steel | steel containing Cr to the extent of from 18 to 26 wt.%. |
| 5 Cr - ½ Mo steel | steel containing Cr to the extent of from 15 to 25 wt.%. |
| 9 Cr - 1 Mo steel | steel containing Cr to the extent of from 15 to 23 wt.%. |

Further, in the present invention, in order to avoid to weld metal cracking arising from the coarsening of crystal grains, it is preferable to admix Nb, Al and Ti in the 1st-layer welding rod. The appropriate content of the respective additive metal on this occasion is in the range of from 0.01 to 1.0 wt.% as for Nb, from 0.01 to 0.05 wt.% as for Al, and from 0.005 to 0.05 wt.% as for Ti.

In the present invention, upon completion of the welding of the first layer, depending on the Cr content (x wt.%) and Mo content (y wt.%) in the base metal, the welding of the second layer is conducted by employing a molybdenum steel or chromium-molybdenum steel containing Cr to the extent of from 0 to 0.3 wt.% and Mo to the extent of from 0.4y to 1.4y wt.% (hereinafter called 'the 2nd-layer welding rod' for short). To select the Cr content and Mo content for the 2nd-layer welding rod according to the Cr content and Mo content in the base metal as above is for the purpose of retaining a concentration of Cr as well as Mo in the second layer at the time of completion of the welding as practically equal to that of the base metal. By virtue of the selection of the 2nd-layer welding rod, a satisfactory second layer of the weld zone can be formed. In this connection, to summarize the applicable combination of the base metal and the second layer, in the case where the base metal is 2¼ Cr — 1 Mo steel, a welding rod consisting of C — ½ Mo steel is optimum, in the case where it is 5 Cr — ½ Mo steel, a welding rod consisting of C —½ Mo steel or ¼ Cr — ½ Mo steel is applicable, and in the case where it is 9 Cr — 1 Mo steel, a welding rod consisting of 2¼ Cr — 1 Mo steel is applicable.

When the welding for the first and second layers is completed, the welded portion is finally welded with the same material as the base metal and the welding operation according to the present invention is completed.

As will be understood from the above description, the welding process according to the present invention is a process wherein the coated side of a coated steel is first welded with a ferritic high chrome steel, next welded with a molybdenum steel or chromium-molybdenum steel corresponding to the Cr content and Mo content of the base metal as prescribed, and further welded with the same material as the base metal. And, this process has the following advantages: first, as the first layer of the weld zone is formed with a ferritic welding rod, the occurrence of any stress corrosion cracking and/or thermal fatigue of said layer can be controlled; next, as the second layer of the weld zone is held at practically the same level as that in the base metal in respect of the content of Cr as well as Mo, there is never formed a decarburized layer such as in the case of welding with dissimilar materials, and accordingly, no deterioration of the quality of weld zone arising from such decarburization takes place; further, this second layer of weld zone is free from hydrogen attack.

In short, according to the welding process under the present invention, as the composition of from the second layer onward in the weld zone can be retained at practically the same level as that of the base metal, said weld zone possesses not only various properties equal to the intrinsic properties of the coated steel (for instance, an excellent sulfidic resistance under high temperature and high pressure, etc.) but also a sufficient mechanical strength.

Hereunder will be given a few examples embodying the present invention, but the scope of the invention is not limited thereto.

EXAMPLE 1

Butt welding of a coated steel pipe produced by applying a diffusion coating with aluminum (base metal: 2¼ Cr — 1 Mo steel, 1½ B, Sch 80) was conducted by employing the process according to the present invention and the process disclosed in Japanese Pat. No. 36814/1973, respectively, and the depth of corrosion arising from sulfidic corrosion of each weld zone was compared. Measurement of the depth of corrosion was conducted upon holding the sample within a 100% $H_2S$ gas having a temperature of 600°C for 100 hours. The kind of each welding rod used in both welding processes and the result of measurement of the depth of corrosion were as shown in the following Table-1.

Table 1

|  | Process according to the present invention | Process disclosed in Japanese Patent Publication No. 36814/1973 |
|---|---|---|
| 1st-layer welding rod | 23 Cr steel | austenitic stainless steel (D 309-16) |
| 2nd-layer welding rod | C - ½ Mo steel | pure iron |
| 3rd-layer welding rod | Same material as the base metal | Same material as the base metal |
| Depth of corrosion | 0.10 mm | 0.26 mm |

As is clear from the above table, the weld zone obtained through the process in the present invention manifests an excellent corrosion resistance. In this context, the first layer of the weld zone was of a high-chrome composition as it was formed by employing 23 Cr steel, but when the degree of increase in hardness of said weld zone in the case of embrittlement at 885°F was examined, no increase in hardness was observed. This verifies that, even when a high chrome steel is employed in the welding process of the present invention, there is no fear of causing embrittlement.

EXAMPLE 2

After welding the coated side of a coated steel produced by applying a diffusion coating of aluminum (base metal: 2¼ Cr — 1 Mo steel, STPA-24) with 23 Cr steel first, and next with C — ½ Mo steel and 2¼ Cr — 1 Mo steel respectively, as the 2nd-layer welding rod, the composition of the respective second layer was analyzed by means of an electron probe microanalyzer. The result was as shown in the following Table-2.

Table 2

| 2nd-layer welding rod | Composition of weld zone (wt.%) | |
|---|---|---|
|  | Cr | Mo |
| pure iron | 3.8 – 4.5 | about 0.15 |
| C - ½ Mo steel | 2.6 – 2.7 | about 0.55 |
| 2¼ Cr - 1 Mo steel | 4.1 – 4.9 | about 0.90 |

As is clear from the showing in the above table, in the case where C — ½ Mo steel was employed as the 2nd-layer welding rod, the composition of the weld zone resembled that of the base metal most closely.

Next, two samples prepared by forming the second layer of the weld zone with C — ½ Mo steel and 2¼ Cr — 1 Mo steel, respectively, as above were welded with the same material as the base metal, whereby the third layer of the weld zone was formed respectively. Then, the neighborhood of the borders of the second layer and the third layer of each sample was observed through a microscope. The accompanying drawings are microphotographs illustrative of the structure in the neighborhood of said borders, FIG. 1 representing the case where C — ½ Mo steel was employed and FIG. 2 representing the case where 2¼ Cr — 1 Mo steel was employed.

Figure 2:
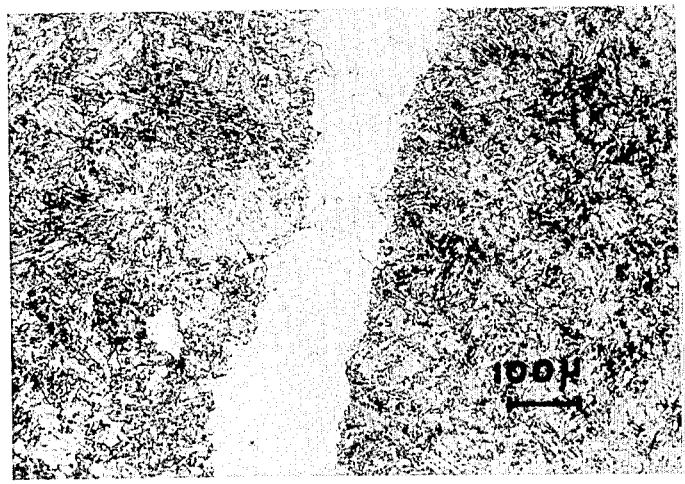
FIG. 2 is a microphotograph illustrative of the structure between the second layer and third layer of the weld zone resulting from the tri-layer butt welding effected on a coated steel having aluminum diffusion coating (base metal: 2¼ Cr — 1 Mo steel) through the process according to the prior art.

As shown in the drawings, in FIG. 2, there was plainly observed the forming of decarburized layer due to the difference in Cr content between the second layer and the third layer, while in FIG. 1, there was observed no such phenomenon. This fact attests to that the forming of decarburized layer can be prevented by properly selecting the 2nd-layer welding rod, and that in the case where the base metal is 2¼ Cr — 1 Mo steel, C — ½ Mo steel is suitable for use as the 2nd-layer welding rod.

What is claimed is:

1. In the multi-layer butt welding process for a coated steel produced by forming a diffusion coating of aluminum or chromium on the surface of a chromium-molybdenum steel as the base metal, a multi-layer butt welding process which comprises: first welding the diffusion coating side of said coated steel with a ferritic stainless steel containing chromium in the range of from 15 to 26 wt.%, thereby forming the 1st layer; next welding it with a low-alloy steel containing chromium in the range of from 0 to $0.3x$ wt.% and molybdenum in the range of from $0.4y$ to $1.4y$ wt.% ($x$ and $y$ herein represent chromium content and molybdenum content, respectively, in the base metal in terms of wt.%), thereby forming the 2nd layer, and further welding it with the same material as the base metal, thereby forming the 3rd layer.

2. A process according to claim 1, wherein said ferritic stainless steel to be used as the welding rod for forming the 1st layer contains Nb in the range of from 0.01 to 1.0 wt.%, Al in the range of from 0.01 to 0.05 wt.%, and Ti in the range of from 0.005 to 0.05 wt.%.

3. A process according to claim 1, wherein the base metal for said coated steel is 2¼ Cr — 1 Mo steel, the welding rod for forming the 1st layer consists of a ferritic stainless steel containing chromium in the range of from 18 to 26 wt.%, and the welding rod for forming the 2nd layer consists of C — ½ Mo steel.

4. A process according to claim 1, wherein the base metal for said coated steel is 5 Cr — ½ Mo steel, the welding rod for forming the 1st layer consists of a ferritic stainless steel containing chromium in the range of from 17 to 25 wt.%, and the welding rod for forming the 2nd layer consists of C — ½ Mo steel or 1¼ Cr — ½ Mo steel.

5. A process according to claim 1, wherein the base metal for said coated steel is 9 Cr — 1 Mo steel, the welding rod for forming the 1st layer consists of a ferritic stainless steel containing chromium in the range of from 15 to 23 wt.%, and the welding rod for forming the 2nd layer consists of 2¼ Cr — 1 Mo steel.

* * * * *